United States Patent
Amans

(10) Patent No.: US 12,556,874 B2
(45) Date of Patent: Feb. 17, 2026

(54) SYSTEM AND METHOD FOR MASKING TINNITUS

(71) Applicant: The Regents of the University of California, Oakland, CA (US)

(72) Inventor: Matthew Amans, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 241 days.

(21) Appl. No.: 18/273,305

(22) PCT Filed: Jan. 20, 2022

(86) PCT No.: PCT/US2022/013059
§ 371 (c)(1),
(2) Date: Jul. 20, 2023

(87) PCT Pub. No.: WO2022/159543
PCT Pub. Date: Jul. 28, 2022

(65) Prior Publication Data
US 2023/0412996 A1    Dec. 21, 2023

Related U.S. Application Data
(60) Provisional application No. 63/139,512, filed on Jan. 20, 2021.

(51) Int. Cl.
| | | |
|---|---|---|
| *H04R 25/00* | (2006.01) | |
| *A61B 5/00* | (2006.01) | |
| *A61B 7/04* | (2006.01) | |

(52) U.S. Cl.
CPC ........... *H04R 25/75* (2013.01); *A61B 5/6831* (2013.01); *A61B 5/7235* (2013.01);
(Continued)

(58) Field of Classification Search
CPC .... H04R 25/75; H04R 25/505; H04R 25/558; H04R 2225/43; A61B 5/6831;
(Continued)

(56) References Cited

U.S. PATENT DOCUMENTS

| | | |
|---|---|---|
| 5,793,875 A | 8/1998 | Lehr et al. |
| 2006/0093997 A1 | 5/2006 | Kearby et al. |

(Continued)

FOREIGN PATENT DOCUMENTS

| | | |
|---|---|---|
| EP | 3591990 A2 | 1/2020 |
| WO | 2020232135 A1 | 11/2020 |

OTHER PUBLICATIONS

International Search Report and Written Opinion of the International Searching Authority issued in corresponding application PCT/US2022/013059 mailed Apr. 11, 2022 (8 pages).

(Continued)

*Primary Examiner* — Tuan D Nguyen
(74) *Attorney, Agent, or Firm* — Carter, DeLuca & Farrell LLP; Vadim Vapnyar

(57) ABSTRACT

A system for masking a perceived sound includes a wearable device disposed on a person, the wearable device including in a plurality of sensors, each of which is configured to output a sound waveform in response to sounds generated by physiological activity of the person. The system also includes a processing device coupled to the plurality of sensors and configured to process the sound waveforms. The system further includes a sound output device coupled to the processing device, the sound output device is configured to output the sound waveforms to mask a perceived sound.

20 Claims, 2 Drawing Sheets

(52) U.S. Cl.
CPC .............. *A61B 5/7435* (2013.01); *A61B 7/04* (2013.01); *H04R 25/505* (2013.01); *H04R 25/558* (2013.01); *A61B 2562/0204* (2013.01); *A61B 2562/0233* (2013.01); *A61B 2562/0247* (2013.01); *H04R 2225/43* (2013.01)

(58) Field of Classification Search
CPC ....... A61B 5/7235; A61B 5/7435; A61B 7/04; A61B 2562/0204; A61B 2562/0233; A61B 2562/0247; A61B 5/128
See application file for complete search history.

(56) References Cited

U.S. PATENT DOCUMENTS

| | | |
|---|---|---|
| 2007/0203416 A1 | 8/2007 | Lowe |
| 2011/0046435 A1 | 2/2011 | Jensen et al. |
| 2019/0022349 A1 | 1/2019 | Kirszenblat et al. |
| 2020/0129760 A1 | 4/2020 | Baker et al. |

OTHER PUBLICATIONS

Extended European Search Report issued in corresponding application EP 22743141 mailed Nov. 13, 2024 (11 pages).

SYSTEM AND METHOD FOR MASKING TINNITUS

CROSS REFERENCE TO RELATED APPLICATIONS

The present application is a U.S. National Stage Application filed under 35 U.S.C. § 371(a) of International Patent Application No. PCT/US2022/013059, filed on Jan. 20, 2022, which claims the benefit of and priority to U.S. Provisional Application No. 63/139,512, filed on Jan. 20, 2021. The entire disclosures of the foregoing applications are incorporated by reference herein.

BACKGROUND

Tinnitus is an auditory perception of sound without an external source. An estimated 50 million Americans suffer from tinnitus. There are very few available treatments for tinnitus. For many, tinnitus is perceived as a ringing sound, while for others, it is perceived as whistling, buzzing, chirping, hissing, and/or humming. The sound may seem to come from one ear or both, from inside the head, or from a distance. Tinnitus may also be constant or intermittent. Thus, there is a need for a system and method to mask tinnitus to provide relief for millions of people suffering from this condition.

SUMMARY

The present disclosure provides a system and method for masking tinnitus, including continuous or intermittent tinnitus. The system includes one or more input devices configured to capture normal physiological sounds of a person wearing the input device(s). Physiological sounds that are recorded include, but are not limited to, blood flow, heartbeat, respiration, digestion, etc. The system also includes one or more output devices configured to play back the physiological sounds at supraphysiological levels to provide the patient suffering from tinnitus with more "normal" sounds. As used herein the term "supraphysiological level" denotes an amplified level that is above the amplitude of the physiological sound when the sound was recorded. These sounds allow the patient to focus on the physiological sounds, thereby masking tinnitus. The system according to the present disclosure may also be used to help any persons suffering from a debilitating state where focus on the "normal" body sounds could be helpful (e.g., meditation training, post-traumatic stress disorder, combat stress, anxiety, insomnia, etc.).

According to one embodiment of the present disclosure, a system for masking a perceived sound is disclosed. The system includes a wearable device disposed on a person, the wearable device including a plurality of sensors, which may be acoustic or ultrasound sensors, each of which is configured to output a sound waveform in response to sounds generated by physiological activity of the person. The system also includes a processing device coupled to the plurality sensors and configured to process the sound waveforms. The system further includes a sound output device coupled to the processing device, the sound output device is configured to output the biological sound waveforms to mask a perceived sound.

Implementations may include one or more of the following features. According to one aspect of the above embodiment, the perceived sound is continuous tinnitus. The wearable device may include a band. The band may be formed from an elastic material configured to induce arterial stenosis thereby increasing blood flow turbulence. In another embodiment, the wearable device may have an ultrasound sensor using Doppler effect to measure the blood flow and transmit a sound waveform from the blood flow measurements. The plurality of sensors includes at least one inner sensor disposed on an inner surface of the band and configured to measure sound generated by the blood flow or blood flow turbulence. The plurality of sensors includes at least one outer sensor disposed on an outer surface of the band and configured to measure external sounds. The sounds generated by the physiological activity of the person include at least one a vascular sound, cardiac sound, respiratory sound, and digestion sound. The processing device may be further configured to categorize the sound waveforms generated by the physiological activity and to store the sound waveforms as sound files in corresponding storage banks. The processing device further includes a user input device configured to display a graphical user interface. The graphical user interface is configured to enable selection of at least one of the sound files for output through the sound output device. The processing device is further configured to mix the sound waveforms. The sound output device may be a headphone, a cochlear implant, or a hearing aide.

According to one embodiment of the present disclosure, a method for masking a perceived sound is disclosed. The method includes placing a wearable device on a person, the wearable device including a plurality of sensors. The method also includes generating a sound waveform at each sensor of the plurality of sensors in response to sounds generated by physiological activity of the person. The method further includes processing at a processing device the sound waveforms and outputting the sound waveforms through a sound output device coupled to the processing device to mask a perceived sound.

Implementations may include one or more of the following features. According to one aspect of the above embodiment, the wearable device includes a band formed from an elastic material configured to induce arterial stenosis thereby increasing blood flow turbulence. According to another aspect of the above embodiment, the wearable device may include an adjustable band where the inner transducer is an ultrasound transducer with the ability to measure blood flow using Doppler effect and transmit the sound waveform of the normal blood flow in the absence of turbulence. The plurality of sensors includes at least one inner sensor disposed on an inner surface of the band and configured to measure sound generated by the blood flow or blood turbulence. The plurality of sensors includes at least one outer sensor disposed on an outer surface of the band and configured to measure external sounds. The sounds generated by the physiological activity of the person include at least one of a cardiovascular sound, a respiratory sound, or a digestion sound. The method may further include categorizing the sounds generated by physiological activity of the person; and storing the categorized sounds as sound files in corresponding storage banks. The method may further include mixing the sound waveforms into a combined sound output, or separating overlapping sound waves into individual component waveforms divided by sound source by matching the waveform to a sound database. The sound output device may be one of a headphone, a cochlear implant, or a hearing aide.

BRIEF DESCRIPTION OF THE DRAWINGS

Embodiments of the present disclosure are described herein with reference to the accompanying drawings, wherein.

DETAILED DESCRIPTION

Figure 1:
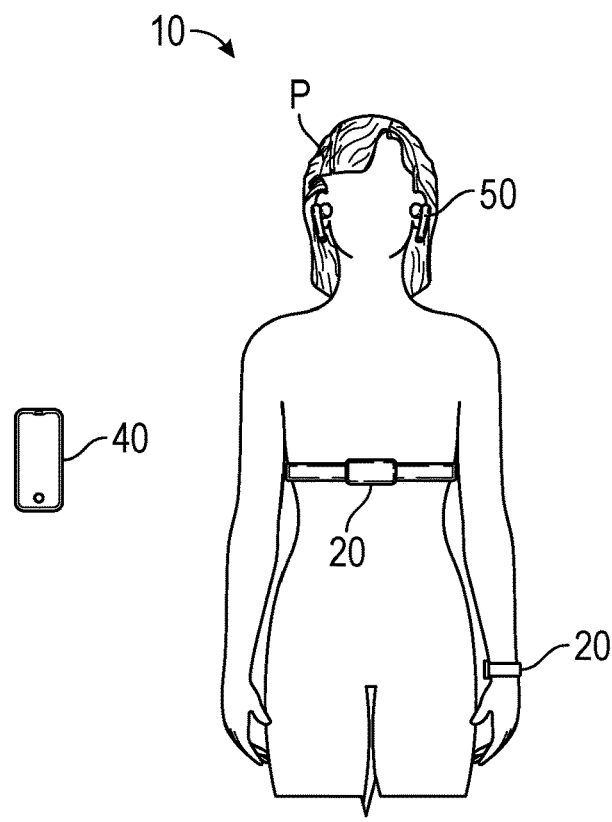
FIG. 1 is a schematic diagram of a system for masking tinnitus according to one embodiment the present disclosure.

Embodiments of the present disclosure are described in detail with reference to the drawings, in which like reference numerals designate identical or corresponding elements in each of the several views. FIG. 1 shows a system 10 for generating sounds to mask tinnitus and other distracting or debilitating sounds. The system 10 includes one or more wearable devices 20 having one or more sensors that are connected to a processing device 30 (FIG. 2), which in turn is connected to a sound output device 50. In embodiments, the processing device 30 may be a computing device 40, i.e., a tablet or a mobile phone. In further embodiments, the computing device 40 may be used in conjunction with the processing device 30. The sound output device 50 may be any suitable headphone or earpiece disposed in and/or over the ear of the patient "P." The sound output device 50 may also be a cochlear implant or any other hearing aide. The sound output device 50 outputs live or prerecorded sounds received by the wearable device 20, such as person's blood flow sounds, breathing sounds, heartbeat, digestion sounds, and other sounds generated by physiological activity of the person "P" body to mask tinnitus.

Figure 2:
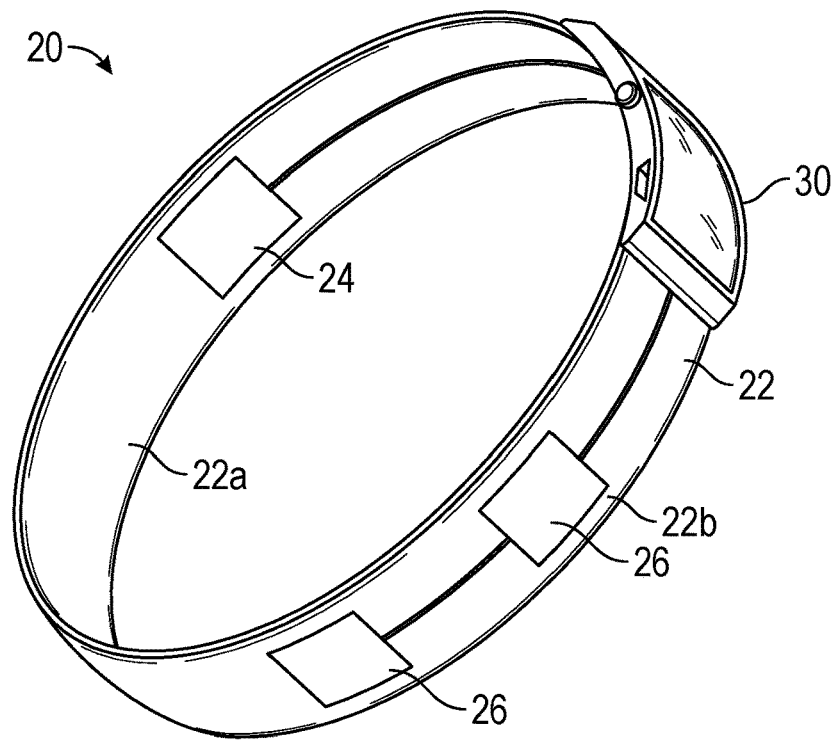
FIG. 2 is a perspective view of a wearable device for receiving sounds according to one embodiment the present disclosure.

With reference to FIGS. 1 and 2, the wearable device 20 may be worn at one or more locations around the body or a limb of a person "P", such as a wrist, ankle, chest, etc. The wearable device 20 may be attached to the person "P" using a band 22 or an adhesive bandage (not shown), such that the wearable device 20 is in physical contact with the person "P" allowing for measurement of sounds generated by the person "P."

When the wearable device 20 is worn around the wrist, the band 22 may be formed from an elastic material, such as silicone, rubber, combinations thereof, or any other suitable stretchable elastomer. The band 22 is fitted about the wrist to induce arterial stenosis, thereby generating blood flow turbulence to enhance sound generation associated with the blood flow. When the wearable device 20 is worn around chest, any suitable strap may be used, such as an adjustable and/or an elastic strap. The band 22 may be formed as a single strip. In embodiments, the band 22 may be formed from one or more strips or filaments woven in any suitable pattern.

The wearable device 20 includes one or more inner sensors 24 disposed an inner surface 22a (i.e., surface directly in contact with the person "P") of the band 22. The inner sensor 24 may be a sensor configured to measure sounds generated within the person "P." The inner sensor 24 may be a microphone or any other type of acoustic transducer configured to measure sound, such as a flexible membrane transducer, a micro-electromechanical systems (MEMS) microphone, an electret diaphragm microphone, or any other microphone. When the wearable device 20 is worn around the wrist, the inner sensor 24 picks up sounds generated by the blood flow, which is accentuated by the compression of the band 22. When the wearable device 20 is worn around chest, the inner sensor 24 picks up sounds generated by the heart, digestive system, respiratory system of the person "P."

According to another embodiment, the inner sensor 24, i.e., when the wearable device 20 is worn around the wrist, may be an ultrasound device configured to measure the blood flow and in the absence of turbulence present the information as a sound waveform using Doppler effect or any other suitable technique. The inner sensor 24 may also be any other suitable transducer, such as an optical transducer, capable of measuring normal blood flow and transmitting blood flow sounds in the absence of turbulence.

The wearable device 20 also includes one or more outer sensors 26 disposed on an outer surface 22b of the band 22. The outer sensor 26 may be the same type of sensor as the inner sensor 24. The outer sensor 26 is configured to pick up sounds generated by the person "P" including, but not limited to, movement, respiratory, and other physiological sounds.

The sensors 24 and 26 are coupled to a processing device 30, which is shown as being attached to the band 22. In embodiments, the processing device 30 may be a standalone device that is separated from the wearable device 20. The sensors 24 and 26 may be coupled to the processing device 30 either through a wired or a wireless communication interface. The sensors 24 and 26 output sound waveform signals corresponding to various sounds generated by the person "P," which are then processed by the processing device 30. In further embodiments, the sensors 24 and 26 may be incorporated into a housing the processing device 30—with the inner sensor 24 disposed on an inner surface of the processing device 30 and the outer sensor 26 disposed on an outer surface of the processing device 30.

Figure 3:
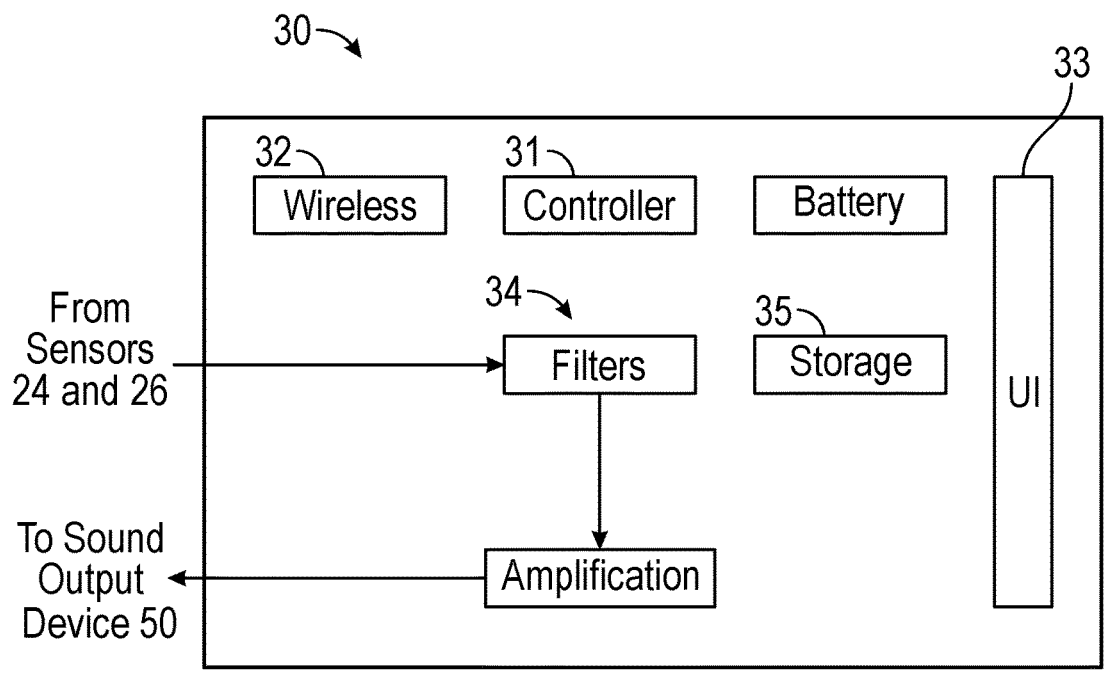
FIG. 3 is a schematic diagram of a processing device of the system of FIG. 2 according to one embodiment of the present disclosure.

With reference to FIG. 3, the processing device 30 includes a controller 31, which may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted by any logic processor (e.g., control circuit) adapted to execute algorithms, calculations, and/or set of instructions described herein.

The system 10 may also include the computing device 40 (FIG. 1), such as a handheld device having a touchscreen and an application for communicating with the processing device 30 thereby replicating the functionality of the user input device 33 and/or other functions of the processing device 30 described herein. In embodiments, the computing device 40 may communicate directly with the wearable device 20, obviating the need for the processing device 30. It is envisioned that various computing environments and architectures may be implemented to provide for measuring, recording, and processing of sounds generated by the person "P" for real-time or subsequent playback on the sound output device 50.

The controller 31 may also include a memory device, which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The controller 31 and the memory device may be any standard processor and memory component known in the art.

The processing device 30 further includes a wireless interface 32, which may include an antenna and any other suitable transceiver circuitry configured to communicate with external devices (e.g., sensors 24 and 26) using wireless communication protocols. Wireless communication may be achieved via one or more wireless configurations, e.g., radio frequency, optical, Wi-Fi, ANT+, BLUETOOTH®, (an open wireless protocol for exchanging data over short distances, using short length radio waves, from fixed and mobile devices, creating personal area networks (PANs), ZIGBEE® (a specification for a suite of high level communication protocols using small, low-power digital radios based on the IEEE 802.15.4-2003 standard for wireless personal area networks (WPANs)), and the like. The processing device 30 may also include a user input device 33, which may include a display, i.e., a touchscreen, and/or one or more buttons, which allow for the user to control the processing device 30.

The processing device 30 further includes a waveform processing circuit 34, which may include discrete components or may be configured as a single circuit. The waveform processing circuits 34 may be analog or digital and may be embodied in the controller 31 as hardware or software components. The sound waveform signal may be digitized by using any suitable method, such as Fourier transform algorithms. The processing device 30 may include any suitable electronic components, such as analog-to-digital (A/D) converters configured to digitize the sound waveform signal.

One of the waveform processing circuits 34 may be a filtering circuit configured to block and/or pass certain frequencies. The filtering circuit may include one or more of the following filters: high pass, low pass, band pass, notch filters and/or digital equivalents thereof. The filtering circuit may be configured to remove ambient sounds (e.g., voices) from detected sound waveforms. The filtered sound waveform signal may also be amplified through an amplifier such that the sound is output at the supraphysiological level. The amplitude may be adjusted by the user through the user input device 33.

The processing device 30 also includes storage 35 for storing recorded sound waveforms as sound files for subsequent playback through the sound output device 50. The processing device 30 may output sound waveforms through the sound output device 50 either in real time or playing back previously recorded sound waveforms. The storage 35 may include a database of various sounds previously recorded by the sensors 24 and 26. Recorded sounds may be categorized based on the source of the sound. Thus, sounds recorded by the inner sensors 24 of the wearable device 20 disposed on the wrist provide vascular (i.e., blood flow) sounds. Similarly, the inner sensors 24 of the wearable device 20 disposed on the chest provide cardiovascular (i.e., heartbeat), respiratory, and digestion sounds. The outer sensors 26 provide movement sounds, vocal sounds, ambient room sounds, as well as respiratory sounds. Each of these sounds are stored in corresponding storage banks that are accessible by the database. In particular, storage banks may be categorized by the type of sound, including, but not limited to, a vascular bank, a cardiac bank, a respiratory bank, a digestion bank, a movement bank, and a miscellaneous bank.

In addition to storing the sound waveforms based on the source sensor, the person "P" may play back the sounds and manually sort and/or categorize the recorded sound using the user input device 33. In further embodiments, sortation and identification of the sounds may be done automatically by the processing device 30 and/or the computing device 40 using machine learning. Part of the identification process may include determining whether the sound waveforms meet certain criteria, i.e., if the amplitude and/or resolution of the recorded sound waveform is sufficient, such that during playback, the sound is clear. It is envisioned that there may be an ongoing training of the identification process to automatically identify the sounds using artificial intelligence.

The terms "artificial intelligence," "data models," or "machine learning" may include, but are not limited to, neural networks, convolutional neural networks (CNN), recurrent neural networks (RNN), generative adversarial networks (GAN), Bayesian Regression, Naive Bayes, nearest neighbors, least squares, means, and support vector regression, among other data science and artificial science techniques.

A neural network may be used to train the processing device 30 and/or the computing device 40. In various embodiments, the neural network may include a temporal convolutional network, with one or more fully connected layers, or a feed forward network. In various embodiments, training of the neural network may happen on a separate system, e.g., graphic processor unit ("GPU") workstations, high performing computer clusters, etc., and the trained algorithm would then be deployed on the processing device 30. In further embodiments, training of the neural networks may happen locally, e.g., on the processing device 30 and/or the computing device 40. After training, the processing device 30 may include a software application that is executable by the controller 31 to identify and sort various recorded sounds into corresponding storage banks.

Figure 4:
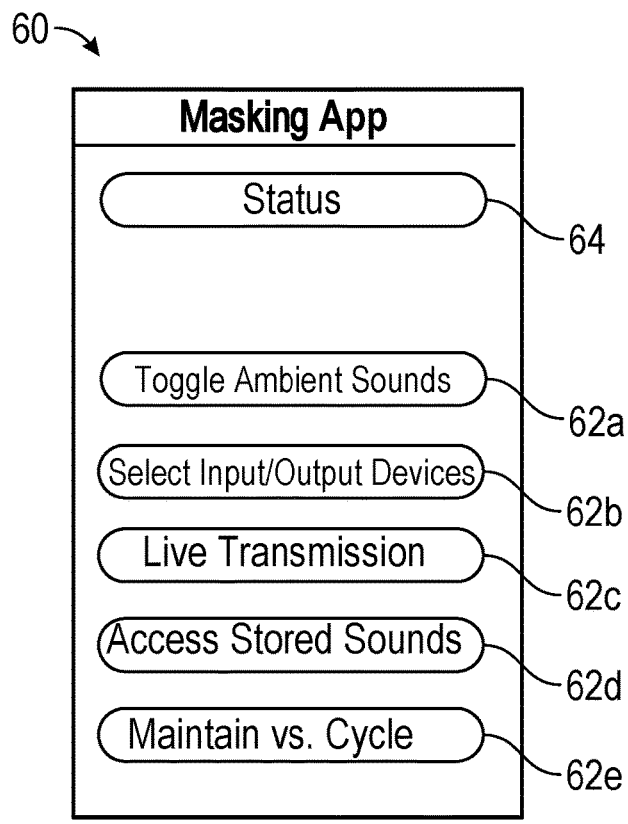
FIG. 4 is a diagram of a graphical user interface of the processing device of FIG. 3 according to one embodiment the present disclosure.

With reference to FIG. 4, an exemplary graphical user interface ("GUI") 60 is shown on a display of the user input device 33. The GUI 60 may include a plurality of buttons 62a-e providing a user with the ability to control the system 10 and a status indicator 64 providing status of the system 10. The indicator 64 may use color and other indicia to provide status for each of the components of the system 10, namely, the wearable device 20, the processing device 30, the computing device 40, and the sound output device 50. The indicator 64 may also display type and condition of the signal being received by the processing device 30. Type indicator may include a descriptor, i.e., cardiac, breathing, or any other category described above, and status indicator may include a strength of the signal, i.e., whether the signal is adequate.

The button 62a is used to adjust the amount of ambient sound that is removed, i.e., filtered, in the output. This may be done via a slider interface allowing the user to input a percentage or other value indicative of the amount of ambient sound being removed from the output. The button 62b may be used to adjust operation of the system 10, i.e., enabling specific sensors 24 and 26, setting type of the sound output device 50, etc. The button 62c allows the user to configure and set the system 10 for real-time transmission of sounds recorded by the sensors 24 and 26 to the sound output device 50. The button 62d allows the user to access the storage banks having prerecorded sounds and select one or more of the sounds for playback through the sound output device 50. The button 62e is used to select between playback types. Playback type may include a cycling mode, in which the sound output device 50 cycles through different sound banks or individual sounds within a specific sound bank.

Another mode may be a continuous mode in which one or more sounds are looped continuously until ended.

During initial setup of the system 10, the person "P" attaches one or more wearable devices 20 to suitable locations on the body, i.e., chest and/or wrist. The person "P" also pairs the sound output device 50 to the processing device 30 and/or the computing device 40. In embodiments, where the computing device 40 is part of the system 10, the processing device 30 may be also paired to the computing device 40 to enable communication with the application running on the computing device 40. Once the initial setup is completed, the processing device 30 is configured to output the sounds based on the options selected through the GUI 60 as described above.

The sound output is based on the selections made by the person "P" through the GUI 60, such as which sounds to output and the output mode, i.e., cycle vs. maintain. More specifically, the output device 50 may be instructed to output one of the sounds or a plurality of the sound waveforms simultaneously. In embodiments, the processing device 30 and/or the computing device 40 may overlay and/or mix multiple waveforms, namely, sounds from multiple storage banks, to output a combined sound waveform. The user may adjust the amplitude of each of the sound waveforms individually, allowing for tailoring of the combined masking sound.

The controller 31 is also configured to automatically configure and adjust operation of the wearable device 20, and in particular, the sensors 24 and 26, as well as the sound output device 50. More specifically, the controller 31 is configured to automatically toggle one or more of the sensors 24 and 26. The controller 31 may analyze the combined sound output to determine whether a certain component of the combined sound waveform is to be increased and activate the sensor(s) 24 or 26 to provide additional sources of that sound. Conversely, the controller 31 may deactivate certain sensors 24 or 26 to lessen the amount of some components of the combined sound output. Activation or deactivation of the sensors 24 and 26 by the controller 31 further finetunes the sounds being played to mask the tinnitus.

The controller 31 is further configured to adjust the waveform processing circuit 34 to modify the filtering being performed on the sound waveform. As described above, filtering may be used to remove ambient sounds and other sounds that are less suitable for masking tinnitus. Reproduction and amplification of physiological sounds allow the patient "P" to be in tune with their physiological processes and to be distracted from tinnitus. Thus, the controller 31 controls preprocessing, i.e., by selecting which sensors 24 and 26 are used, as well as postprocessing, i.e., filtering detected sounds, to tailor the sound played through the sound output device 50.

Figure 5:
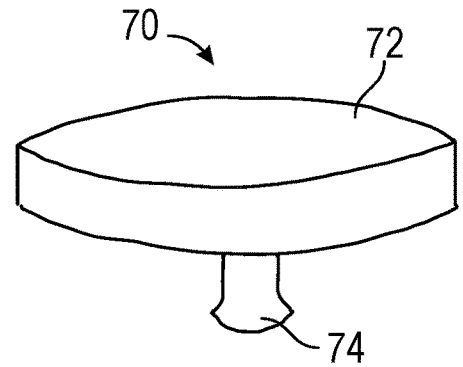
FIG. 5 is a perspective view of a wearable transducer assembly according to one embodiment the present disclosure.

With reference to FIG. 5, the system 10 may also include additional devices configured to couple to the processing device 20 and/or computing device 16. In particular, the system 10 may include a transducer assembly 70 having a housing 72, which may enclose the sensor 24 as well as other components of the processing device 20, such as the sensor 26, a driver circuit, a transmitter, etc. The transducer assembly 70 may include a post 74 or other attachment means configured to secure the transducer assembly 70 to a band worn around the patient's wrist (e.g., watchband of an Apple Watch®). The transducer assembly 70 may be positioned on the underside of the watchband, such that the transducer assembly 70 is positioned over the artery.

It will be appreciated that of the above-disclosed and other features and functions, or alternatives thereof, may be desirably combined into many other different systems or applications. Various presently unforeseen or unanticipated alternatives, modifications, variations or improvements may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. A system for masking a perceived sound, the system comprising:
   a wearable device disposed on a person, the wearable device including a plurality of sensors, each of which is configured to output a sound waveform in response to sounds generated by a physiological activity of the person;
   a processing device coupled to the plurality of sensors and configured to process the sound waveforms, wherein the sound waveforms are categorized based on at least one of an amplitude or a resolution thereof to enhance playback clarity and stored as sound files; and
   a sound output device coupled to the processing device, the sound output device is configured to output the sound waveforms to mask a perceived sound.

2. The system according to claim 1, wherein the perceived sound is continuous tinnitus.

3. The system according to claim 1, wherein the wearable device includes a band.

4. The system according to claim 3, wherein the band is formed from an elastic material configured to induce arterial stenosis thereby increasing blood flow turbulence.

5. The system according to claim 4, wherein the plurality of sensors includes at least one inner sensor disposed on an inner surface of the band and configured to measure sound generated by the blood flow turbulence, and the at least one inner sensor is at least one of an acoustic sensor, an ultrasound sensor, or an optical sensor.

6. The system according to claim 4, wherein the plurality of sensors includes at least one outer sensor disposed on an outer surface of the band and configured to measure external sounds, and the at least one outer sensor is an acoustic sensor.

7. The system according to claim 1, wherein the sounds generated by the physiological activity of the person include at least one of a vascular sound, respiratory sound, and digestion sound.

8. The system according to claim 1, wherein the processing device further includes a user input device configured to display a graphical user interface.

9. The system according to claim 8, wherein the graphical user interface is configured to enable selection of at least one of the sound files for output through the sound output device.

10. The system according to claim 1, wherein the processing device is further configured to mix the sound waveforms.

11. The system according to claim 1, wherein the sound output device is at least one of a headphone, a cochlear implant, or a hearing aide.

12. The system of claim 1, wherein the categorization includes ongoing training to automatically identify the sound waveforms using machine learning.

13. A method for masking a perceived sound, the method comprising:

placing a wearable device on a person, the wearable device including a plurality of sensors;

generating a sound waveform at each sensor of the plurality of sensors in response to sounds generated by a physiological activity of the person;

processing at a processing device the sound waveforms, including:

categorizing the sounds based on at least one of an amplitude or a resolution thereof to enhance playback clarity; and storing the categorized sounds as sound files; and outputting the sound waveforms through a sound output device coupled to the processing device to mask a perceived sound.

14. The method according to claim 13, wherein the wearable device includes a band formed from an elastic material configured to induce arterial stenosis thereby increasing blood flow turbulence.

15. The method according to claim 14, wherein the plurality of sensors includes at least one inner sensor disposed on an inner surface of the band and configured to measure sound generated by the blood flow turbulence, and the at least one inner sensor is at least one of an acoustic sensor, an ultrasound sensor, or an optical sensor.

16. The method according to claim 15, wherein the plurality of sensors includes at least one outer sensor disposed on an outer surface of the band and configured to measure external sounds, and the at least one outer sensor is an acoustic sensor.

17. The method according to claim 13, wherein the sounds generated by the physiological activity of the person include at least one of a cardiovascular sound, a respiratory sound, or a digestion sound.

18. The method according to claim 13, further comprising:

mixing the sound waveforms into a combined sound output.

19. The method according to claim 13, wherein the sound output device is at least one of a headphone, a cochlear implant, or a hearing aide.

20. A system for masking a perceived sound, the system comprising:

a wearable device disposed on a person, the wearable device including:

a band formed from an elastic material configured to induce arterial stenosis thereby increasing blood flow turbulence; and a plurality of sensors, each of which is configured to output a sound waveform in response to sounds generated by a physiological activity of the person, wherein the plurality of sensors includes:

at least one ultrasound sensor disposed on an inner surface of the band and configured to measure sound generated by blood flow, wherein, for nonturbulent blood flow, the measured sound is presented as sound waveforms using the Doppler effect; and at least one acoustic sensor disposed on an outer surface of the band and configured to measure external sounds;

a processing device coupled to the plurality of sensors and configured to process the sound waveforms, wherein the sound waveforms are categorized using machine learning based on at least one of an amplitude or a resolution thereof to enhance playback clarity and stored as sound files, wherein the categorization further includes ongoing training to automatically identify the sound waveforms using machine learning; and a sound output device coupled to the processing device, the sound output device is configured to output the sound waveforms to mask a perceived sound.

* * * * *